(12) United States Patent
Jagoda et al.

(10) Patent No.: US 11,949,648 B1
(45) Date of Patent: Apr. 2, 2024

(54) REMOTE CONNECTIVITY MANAGER

(71) Applicant: SAP SE, Walldorf (DE)

(72) Inventors: Michal Jagoda, Gliwice (PL); Filip Mysliwiec, Katowice (PL); Wojciech Pietrzak, Gliwice (PL); Lukasz Kasztelan, Katowice (PL); Adam Morawiec, Siemianowice Slaskie (PL); Rafal Zelek, Tarnowskie Gory (PL); Marzena Cudecka, Gliwice (PL); Ralf-Dietmar Dittmann, St. Leon-Rot (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/059,789

(22) Filed: Nov. 29, 2022

(51) Int. Cl.
*H04L 61/2592* (2022.01)
*H04L 9/40* (2022.01)

(52) U.S. Cl.
CPC ...... *H04L 61/2592* (2013.01); *H04L 63/0281* (2013.01)

(58) Field of Classification Search
None
See application file for complete search history.

(56) References Cited

U.S. PATENT DOCUMENTS

| | | | |
|---|---|---|---|
| 7,284,068 B1 * | 10/2007 | Ramalho | H04W 60/005 709/218 |
| 7,334,018 B2 | 2/2008 | Elms | |
| 7,590,987 B2 | 9/2009 | Behrendt et al. | |
| 7,703,024 B2 | 4/2010 | Kautzleben et al. | |
| 7,818,721 B2 | 10/2010 | Sundararajan et al. | |
| 7,849,445 B2 | 12/2010 | Tran | |
| 7,945,677 B2 | 5/2011 | Fleischer et al. | |
| 8,161,169 B2 | 4/2012 | Fleischer et al. | |
| 8,438,535 B2 | 5/2013 | Sun | |
| 8,555,176 B2 | 10/2013 | Elumalai et al. | |

(Continued)

OTHER PUBLICATIONS

Dondeti, "SAP Remote Access and Connectivity (SAP RAC)", available from https://blogs.sap.com/2019/01/03/sap-remote-access-and-connectivity-sap-rac/, 10 pages (Jan. 2019).

(Continued)

*Primary Examiner* — James A Edwards
(74) *Attorney, Agent, or Firm* — Fountainhead Law Group P.C.

(57) ABSTRACT

Connectivity between remote networks is managed by a central engine that collects and stores network data such as network addresses, URLs, hostnames, and/or other information. The engine creates a tunnel proxy, as well as separate respective tunnels with the remote networks. Based upon network data, the engine references the tunnel proxy to create a logical link joining the respective tunnels. Data can then flow between the remote networks through the logical link. The logical link may exist for only a limited time, e.g., as determined by a timer. Certain embodiments may be particularly suited to empower a customer network to manage connectivity with the remote network of a support provider. The customer can initiate connectivity changes without the manual involvement of the support provider. The customer can also authorize the support provider to manage connectivity and initiate changes under prescribed conditions.

20 Claims, 5 Drawing Sheets

(56) References Cited

U.S. PATENT DOCUMENTS

| | | | |
|---|---|---|---|
| 9,117,019 | B2 | 8/2015 | Wintergerst et al. |
| 9,183,540 | B2 | 11/2015 | Eberlein et al. |
| 9,762,613 | B2 | 9/2017 | Cherukuri et al. |
| 9,807,169 | B2 | 10/2017 | Blumenthal-Barby et al. |
| 9,860,249 | B2 | 1/2018 | Dulkin et al. |
| 10,992,744 | B1 | 4/2021 | Kutuzov et al. |
| 11,570,269 | B2 | 1/2023 | Dittmann et al. |
| 2005/0198501 | A1 | 9/2005 | Andreev et al. |
| 2007/0245007 | A1* | 10/2007 | Tsirtsis .................. H04W 8/04 709/223 |
| 2010/0023602 | A1 | 1/2010 | Martone |
| 2013/0086218 | A1* | 4/2013 | Adams ................ H04L 63/029 709/218 |
| 2013/0239172 | A1* | 9/2013 | Murakami ............ H04L 63/102 726/1 |
| 2014/0157398 | A1 | 6/2014 | McKinney |
| 2015/0271162 | A1 | 9/2015 | Dulkin et al. |
| 2016/0371172 | A1 | 12/2016 | Rumsey |
| 2017/0223063 | A1* | 8/2017 | Herrero ............... H04L 65/1045 |
| 2021/0149788 | A1 | 5/2021 | Downie et al. |
| 2021/0306275 | A1* | 9/2021 | Ke .......................... H04L 47/24 |
| 2022/0103525 | A1* | 3/2022 | Shribman ............. G06F 16/955 |

OTHER PUBLICATIONS

SAP, "Connecting to a Remote System", downloaded from https://help.sap.com/viewer/8c44 f 49685f 44be4aa420bbf6393aeea/ 7 .3 .20/en-US/47bla87eac671599e10000000a42189c.html on Aug. 17, 2020, 2 pages.

SAP, "Enabling/Disabling Remote Access in FPN Connections", downloaded from https://help.sap.com/doc/saphelp_nw73ehp 1/7 .31.19/en-US/49/5c8ef94a662221e10000000a42189d/content.htm?no_cache=true on Aug. 17, 2020, 2 pages.

SAP, "Remote Support", downloaded from https ://support.sap .com/ en/tools/ connecti vity-tools/remote-support.html#section on Aug. 17, 2020, 6 pages.

SAP, "SAP Integration and Certification Center", available from https://www .sap.com/docs/download/2017 /02/683dl 1Oc-a77c-OO10-82c7- eda71af511fa.pdf, pp. 1-8 (apparent date May 2020).

SAP, "Setting Up Service Connections for SAP Remote Support", downloaded from https://help.sap.com/saphelp_nwpi711/helpdata/en/96/ea39e6feb4457793cb00dlfee 4e8fd/content.htm?no_cache=true on Aug. 17, 2020, 2 pages.

* cited by examiner

REMOTE CONNECTIVITY MANAGER

BACKGROUND

Unless otherwise indicated herein, the approaches described in this section are not prior art to the claims in this application and are not admitted to be prior art by inclusion in this section.

With the advent of cloud computing, it has been increasingly desirable for remote users to be able to easily and efficiently access cloud systems. This trend has only been accelerated by the COVID 19 pandemic and the embrace of remote work environments.

A main effort in realizing a remote connection solution, is network configuration and its maintenance. That is, parties must configure their network data. Effectively establishing such accurate configurations over time can be demanding and prone to error.

SUMMARY

Connectivity between remote networks is managed by a central engine that collects and stores network data such as network addresses, URLs, hostnames, and/or other information. The engine creates a tunnel proxy, and establishes separate respective tunnels with the remote networks. Based upon network data, the engine references the tunnel proxy to create a logical link joining the respective tunnels. Data can then flow between the remote networks through the logical link. The logical link may exist for only a limited time, e.g., as determined by a timer. Certain embodiments may be particularly suited to empower a first (customer) network to manage connectivity with a second (remote) network of a support provider. Utilizing the central engine, the customer can establish the connection and initiate connectivity changes between the remote networks, without requiring the manual intervention of the support provider. The customer can also authorize the support provider to manage connectivity and initiate changes under prescribed conditions.

The following detailed description and accompanying drawings provide a better understanding of the nature and advantages of various embodiments.

DETAILED DESCRIPTION

Described herein are methods and apparatuses that implement remote connectivity services between different systems. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
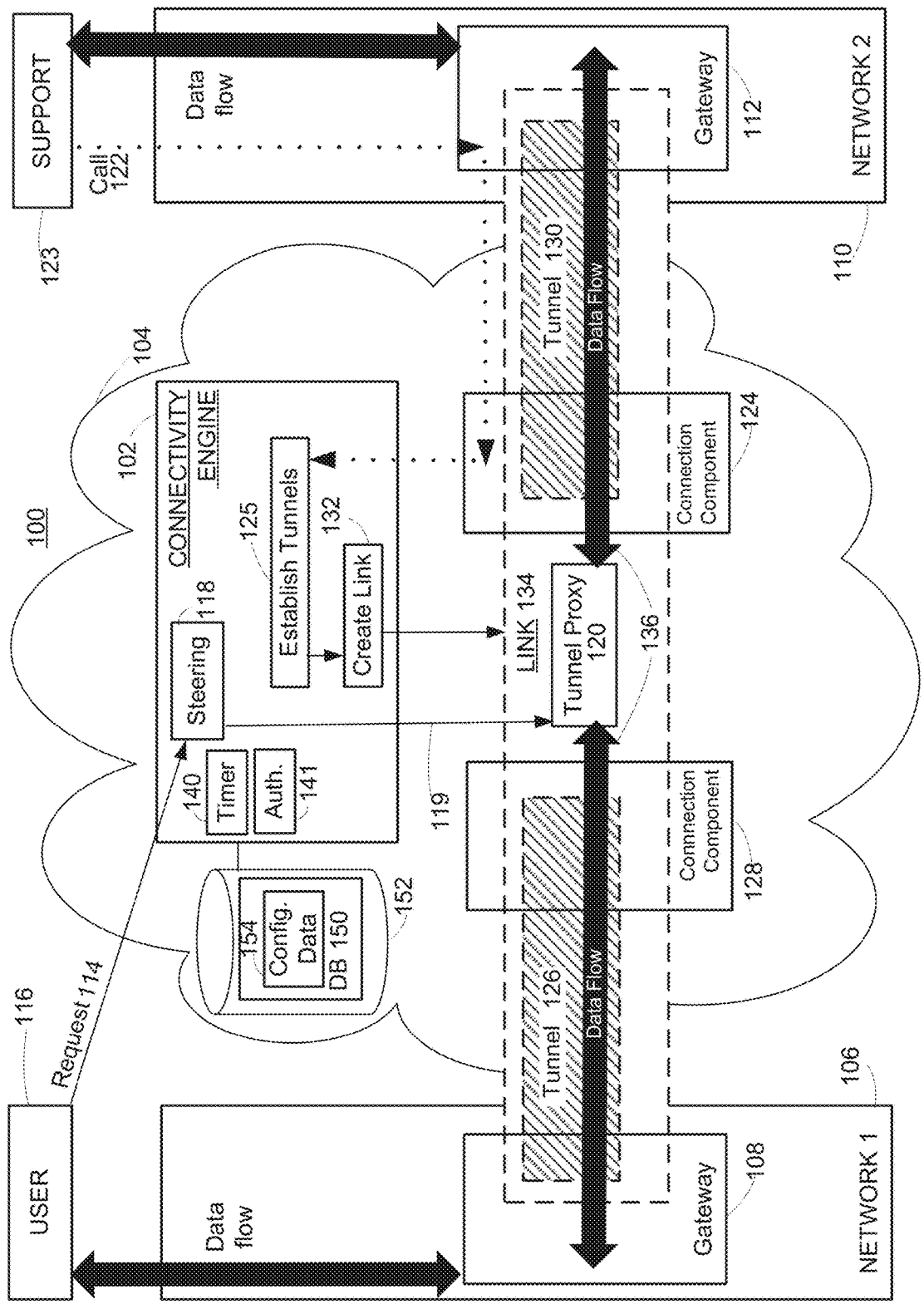
FIG. 1 shows a simplified diagram of a system according to an embodiment.

FIG. 1 shows a simplified view of an example system that is configured to implement remote connectivity services. In particular, a connectivity engine 102 is positioned within cloud network 104.

A first network 106 is in selective communication with the cloud network through first gateway 108. In certain embodiments, the first network may be that of a customer who seeks to manage connectivity with other networks.

A second network 110 remote from the first network, is in selective communication with the cloud network through second gateway 112. In certain embodiments, the second network may be that of a vendor who seeks to support the network of the customer.

The central connectivity engine receives a request 114 from a user 116 of the first network. In response to the request, the connectivity engine performs steering 118 in order to construct 119 a tunnel proxy 120.

Next, the connectivity engine receives a call 122 from the user 123 of the second network via the second gateway and a connection component 124. In some embodiments, the call may be a Representational State Transfer (REST) call.

In response to the call (and the original request), the connectivity engine establishes 125 tunnels with the remote networks. Specifically, tunnel 126 is established between connection component 128 and the gateway 108. Tunnel 130 is established between connection component 124 and the gateway 112.

Then, the connectivity engine joins together the two tunnels using the tunnel proxy to create 132 a link 134. The link serves as a pathway for communication between the remote networks. In particular, data flow 136 may traverse the link.

It is noted that the link may be limited in scope. For example, in some embodiments a timer 140 may permit the link to exist for only a time window having a fixed duration.

Moreover, the link may be limited in terms of creation. For example, the engine may include authorization 141 that specifically dictates those particular conditions (if any) according to which the user of the second network may be able to independently access the central engine and (manually; automatically) initiate and/or perform remote connectivity management functions.

The central connectivity engine may be in communication with database 150 that is present within non-transitory computer readable storage medium 152. The engine may reference various types of stored configuration data 154, including but not limited to one or more of:
  IP addresses;
  hostnames;
  URLs;
  other(s).

Stored configuration data that is referenced by the central engine to perform remote connectivity management, may relate to one or more of:
  network(s);
  user(s);
  gateway(s);
  connection component(s)
  proxy(s);
  link(s);
  tunnel(s);
  time(s);
  authorization(s);
  other(s).

Figure 2:
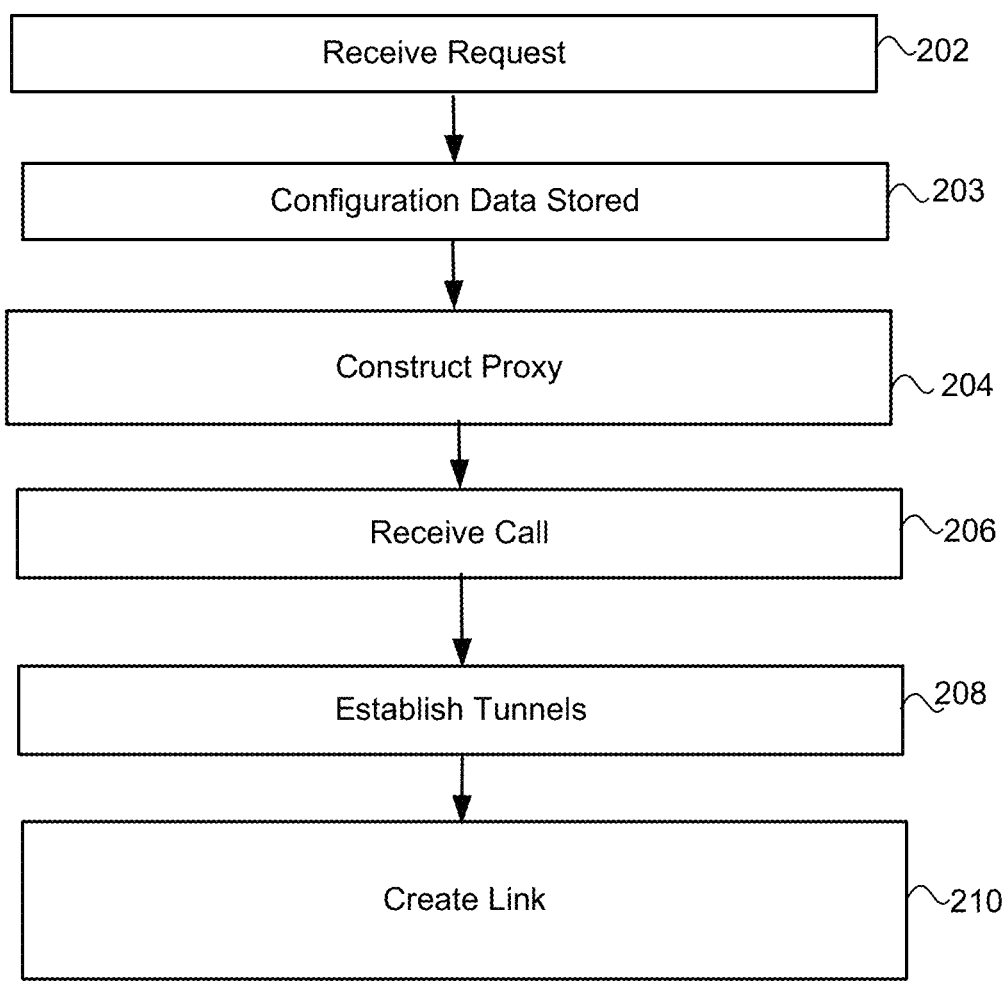
FIG. 2 shows a simplified flow diagram of a method according to an embodiment.

FIG. 2 is a flow diagram of a method 200 according to an embodiment. At 202, a request is received. At 203, configuration data is stored.

At 204, a tunnel proxy is constructed. At 206, a call is received.

At 208, tunnels are established. At 210, a logical link is created by joining the tunnels.

Further details regarding the implementation of remote connectivity services according to various embodiments, are now provided in connection with the following example. This example utilizes cloud infrastructure and cloud technologies available from SAP SE of Walldorf, Germany.

EXAMPLE

Remote connectivity services implemented by SAP SE of Walldorf, Germany, may be based upon the following components:
customer server application and infrastructure,
network connectors and proxies,
SAP internal application and underlying infrastructure.

Embodiments create a middleware that works as a broker and a secure remote connectivity hub between customers and SAP. Embodiments provide SAP customers and SAP employees with an easy-to-use, scalable, loosely coupled, and secure solution for remotely connecting trusted components, systems and applications with each other.

The customer remote connectivity manager is a central gateway for each customer to temporarily link its network with that of SAP. This solution accommodates multiple tenants, and is available over a variety of locations for performance optimization and to meet country specific regulations. Customers using the SAP Remote Connectivity for Customers solution, can experience onboarding and remote connectivity infrastructure preparation.

Figure 3:
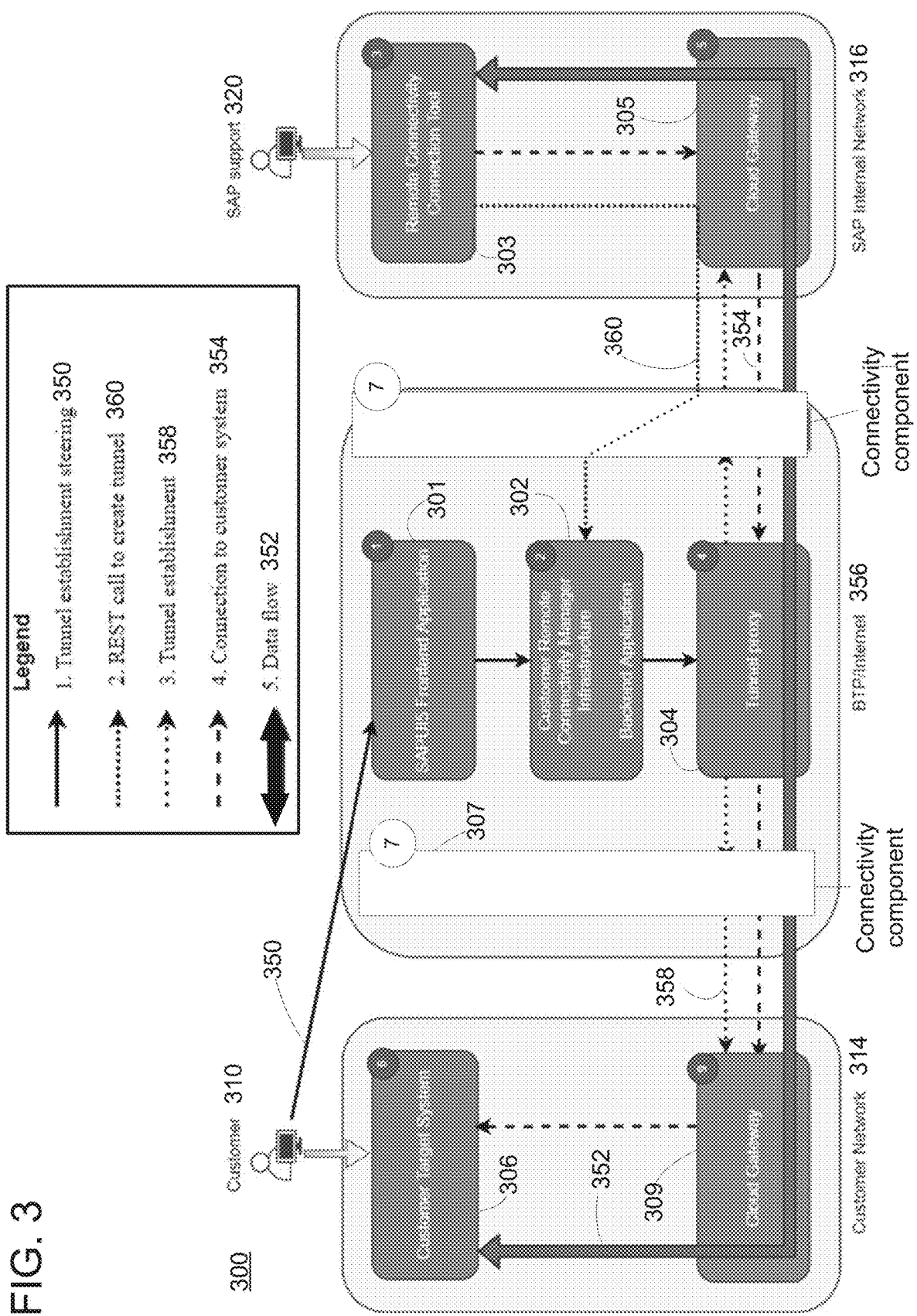
FIG. 3 shows a simplified view of a system embodiment according to an example.

FIG. 3 shows a general architecture 300. The SAP UI5 application 301 is a cloud application that is available for customers to manage remote connectivity to target solutions.

The customer remote connectivity manager 302 is a web-based application that includes:
configuration data for the connections,
system data of the customer's remote connectivity landscape, and
credentials management.

The customer remote connectivity manager provides customers with a way to access and change different user profiles and roles. The customer remote connectivity manager is relatively easy to manage, is expandable, and provides APIs for automation.

Customers 310 and SAP support 320 have access on two separate networks 314 and 316 respectively. Customer 310 has access to SAPUI5 Frontend Application 301. SAP support 320 has access to a different SAPUI5 Frontend Application.

Thus, in order to provide the remote connection between these separate networks, two tunnels are created that are joined together to form one secure link. The connection can be established 358 using two cloud gateways: one cloud gateway 309 present on the customer side, and another cloud gateway 305 present on the SAP side. The cloud gateways afford connection between the customer network and SAP network using a secure tunnel technique.

Initially, for general security reasons the two networks are separated and work as separate tunnels. However, the cloud gateways—together with the connectivity components 307 and the tunnel proxy 304—function to establish and control a logical link between the client at SAP and the server at the customer side.

The cloud gateways may be configured (manually or automatically) by the customer, and by SAP support. The SAP internal solution 303 is a remote connectivity platform and infrastructure for SAP employees. The SAP internal solution offers an environment allowing control and establishing of secure remote connections to customers' systems using certified client tools.

A general process flow for this example is now described as follows.

First, as part of tunnel establishment steering 350, the customer opens the customer remote connectivity manager UI5 application, to gain access and maintain connections that are available for opening.

Second, the customer chooses the connection type that should be opened and used by the SAP support employees. When choosing the connection type, the customer can specify a duration of time for the connection to be visible to its target solution and accessible by SAP and/or its partners.

The customer has the option to authorize SAP to open the connection whenever remote access by SAP is needed. The customer will be notified of the request and has the option to approve it manually or automatically. This functionality of the customer remote connectivity manager offers flexible interactions between the customers and SAP support.

Third, when the customer chooses to open a connection in the application frontend 301, information is running in the backend 302 that such a request for opening a connection is sent. In response to this request, the SAP support issues a call 360 (via the SAP side cloud gateway and connectivity component) to create the tunnel. In some embodiments this may be a REpresentational State Transfer (REST) call.

Cloud gateways 305 and 309 (pre-configured for the connection) represent two separate network tunnels. The two separate tunnels will be linked logically together by using the tunnel proxy 304 and two connectivity components 307.

The tunnels serve to form a secure link for the system connection 354 from the Remote Connectivity Connection Tool 303 to the Customer Target System 306. The link provides the data traffic flow 352 for a specifically selected protocol towards defined customer system.

Fourth, SAP support can now access the customer's system through the defined connection type, as long as the corresponding connection is not closed. As shown by the direction of the arrow 354 in FIG. 3, the connection works from the SAP system to the customer system.

However, as shown by the double-headed arrow 352 in FIG. 3, the data flow goes both ways. That is, data can flow from the customer network system to the SAP network, as well as vice-versa.

The middleware 356 behaves as a broker between the two environments and provides a remote support foundation. Here, the middleware can comprise the SAP Business Technology Platform (BTP) and/or the internet.

Fifth, the opened connection may close automatically as soon as a predefined duration expires. The opened connection may also be closed manually by the customer or by SAP support.

Embodiments may offer one or more benefits. One possible benefit is readiness to adapt to a variety of deployment environments.

In particular, remote connectivity according to embodiments creates a remote connectivity control hub located between communication partners. This approach allows attached clients to be connected to an associated server on a customer site, independent of its deployment model (e.g., cloud, on-premise, or hybrid).

Another possible benefit is flexibility. That is, the customer is in control of the remote connectivity, and is not waiting on the support to implement the solution. Customers can manage the remote connections as they wish. Customers can open a connection for a specified time period, or allow SAP to manage the connections At least three possible use cases are possible. First, customers can approve each open connection request issued manually if needed. Second, customers can start a connection at any time manually or by configuring a time period for an open connection. Third, customers can authorize support representatives to open the connection, allowing access to customers' solutions as needed.

Still another possible benefit offered by embodiments, is security. The remote connectivity infrastructure setup limits security risks when a connection takes place. The remote connectivity infrastructure does not allow connections to be kept open when not needed. A narrow tunneling technique is used to keep open only the necessary link.

Other possible benefits include one or more of:
compatibility with multitenancy
scalability
high availability
reliable performance due to geographic distribution.

Returning now to FIG. 1, there the particular embodiment is depicted with the connectivity engine as being located outside of the database. However, this is not required.

Rather, alternative embodiments could leverage the processing power of an in-memory database engine (e.g., the in-memory database engine of the HANA in-memory database available from SAP SE), in order to perform various functions as described above.

Figure 4:
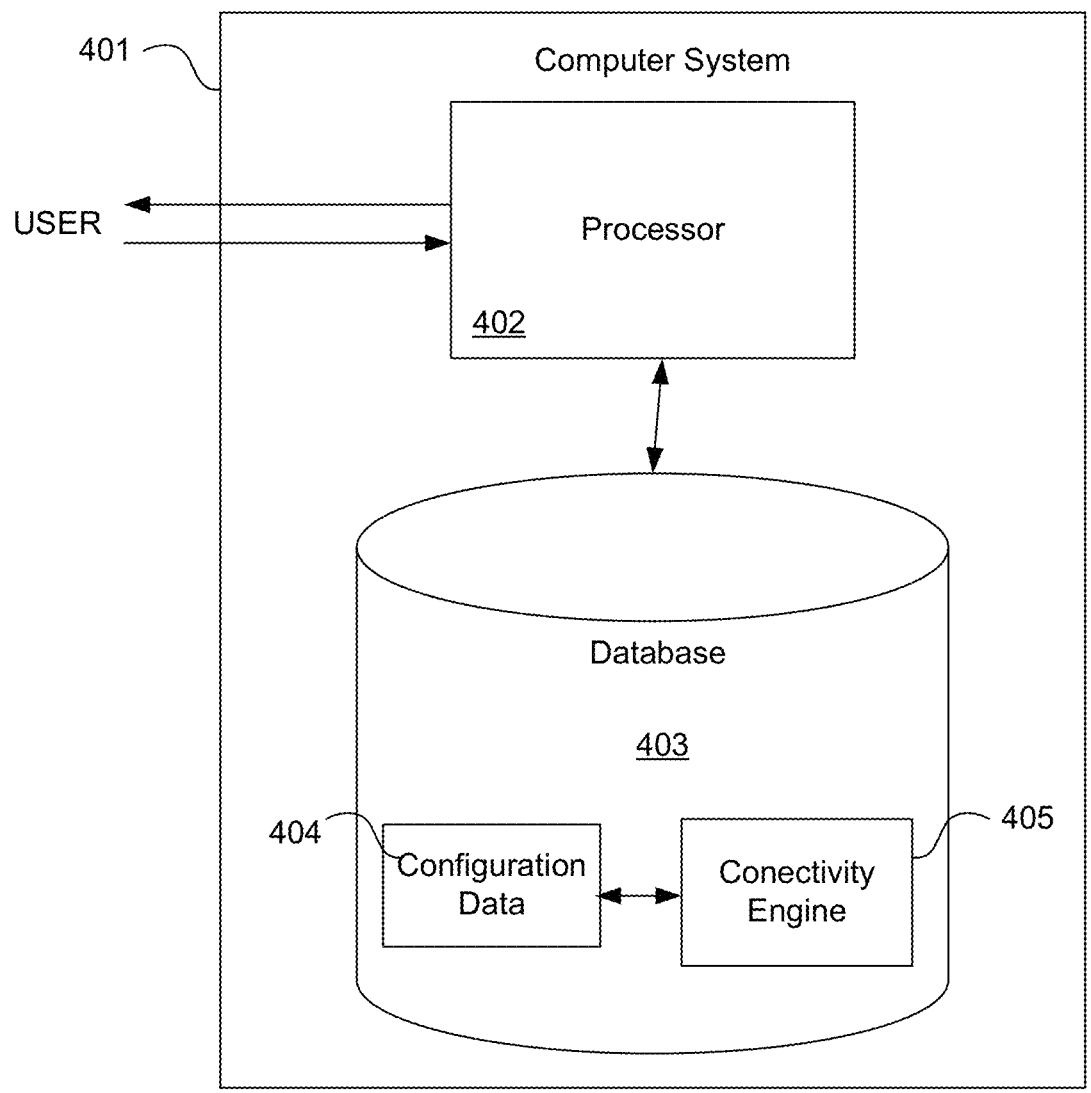
FIG. 4 illustrates hardware of a special purpose computing machine configured to implement remote connectivity management according to an embodiment.

Thus FIG. 4 illustrates hardware of a special purpose computing machine configured to implement remote connectivity services according to an embodiment. In particular, computer system 401 comprises a processor 402 that is in electronic communication with a non-transitory computer-readable storage medium comprising a database 403. This computer-readable storage medium has stored thereon code 405 corresponding to a connectivity engine. Code 404 corresponds to configuration data. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising:
receiving a request from a user of a first network comprising a first gateway;
storing, in a non-transitory computer readable storage medium, configuration data of the first network;
in response to the request, constructing a tunnel proxy based upon the configuration data;
receiving a call from a second network remote from the first network and comprising a second gateway;
establishing, in response to the call,
a first tunnel between a first connection component and the first gateway, and
a second tunnel between the second connection component and the second gateway; and
utilizing the tunnel proxy to join the first tunnel with the second tunnel to create a link, wherein data flows between the first network and the second network using the link.

Example 2. The computer implemented system and method of Example 1 wherein the call is a REpresentational State Transaction (REST) call.

Example 3. The computer implemented system and method of Examples 1 or 2 wherein the configuration data comprises a URL.

Example 4. The computer implemented system and method of Examples 1, 2, or 3 wherein the configuration data comprises a hostname.

Example 5. The computer implemented system and method of Examples 1, 2, 3, or 4 wherein the configuration data comprises an IP address.

Example 6. The computer implemented system and method of Examples 1, 2, 3, 4, or 5 wherein the link is established based upon an authorization.

Example 7. The computer implemented system and method of Example 6 wherein the authorization relates to a user of the second network.

Example 8. The computer implemented system and method of Examples 1, 2, 3, 4, 6, or 7 further comprising terminating the link.

Example 9. The computer implemented system and method of Example 8 wherein the link is terminated based upon expiration of a timer.

Example 10. The computer implemented system and method of Examples 1, 2, 3, 4, 6, 7, 8, or 9 wherein:
the non-transitory computer readable storage medium comprises an in-memory database; and an in-memory database engine of the in-memory database constructs the tunnel proxy.

Figure 5:
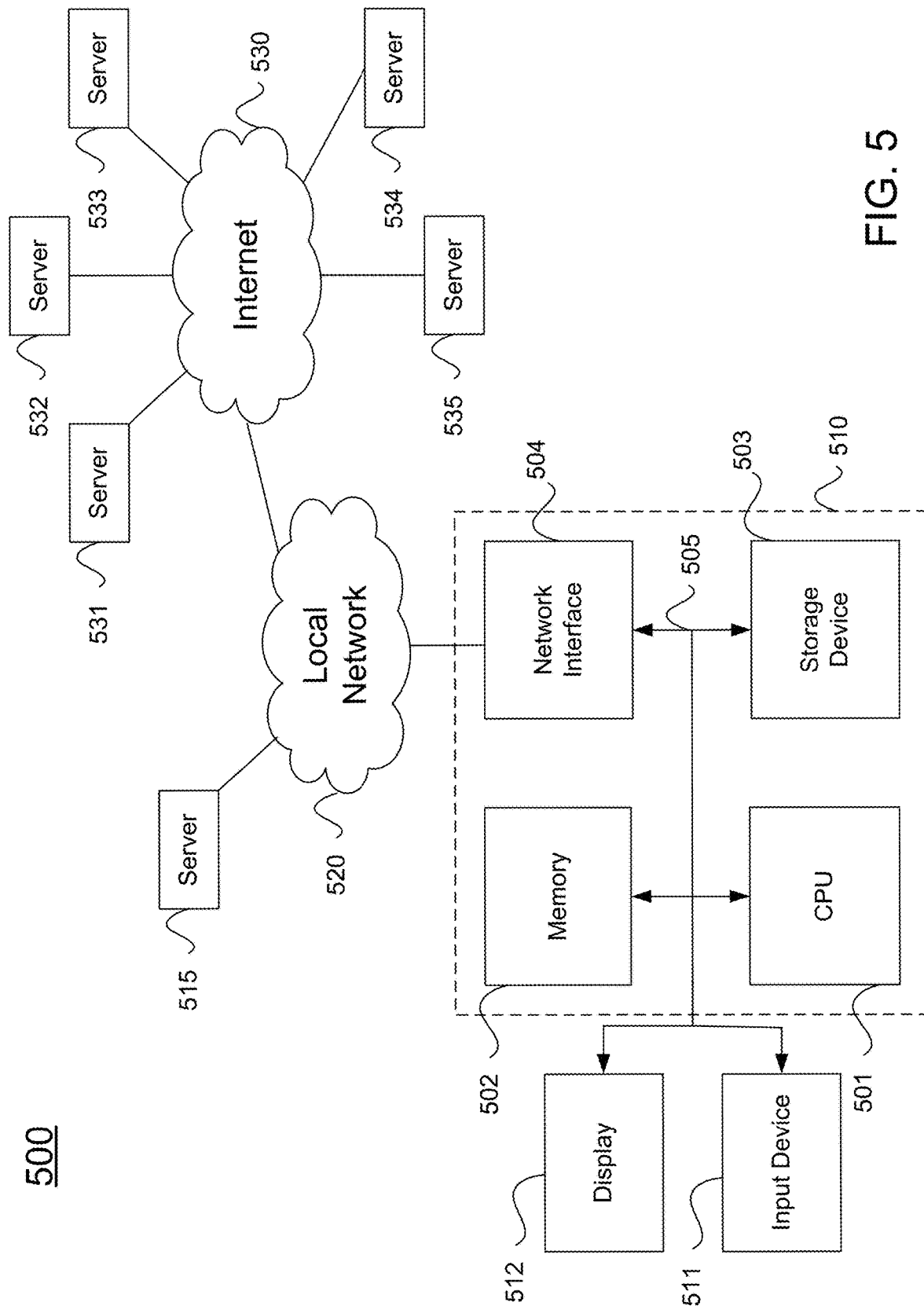
FIG. 5 illustrates an example computer system.

An example computer system 500 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a Light Emitting Diode (LED) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 610 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
    storing, in a non-transitory computer readable storage medium, configuration data used to establish a secure connection to a first network;
    receiving, in a first frontend application, a request from a first user of the first network, the first network comprising a first gateway to a target system, wherein the first user authorizes a second user to access the target system;
    receiving, in a backend application, a call from a second network initiated by the second user using a remote connectivity application, wherein the second network is remote from the first network, wherein the second network is coupled to the remote connectivity application, the second network comprising a second gateway;
    constructing a tunnel proxy based upon the configuration data to authorize the second user to access the target system;
    establishing, in response to the call,
    a first tunnel between a first connection component and the first gateway, and
    a second tunnel between a second connection component and the second gateway; and
    utilizing the tunnel proxy to join the first tunnel with the second tunnel to create a link, wherein data flows between the first network and the second network using the link.

2. A method as in claim 1 further comprising terminating the link.

3. A method as in claim 2 wherein the link is terminated based upon expiration of a timer.

4. A method as in claim 1 wherein the link is established based upon an authorization.

5. A method as in claim 4 wherein the authorization relates to the second user of the second network.

6. A method as in claim 1 wherein the call is a REpresentational State Transfer (REST) call.

7. A method as in claim 1 wherein the configuration data comprises a hostname.

8. A method as in claim 1 wherein the configuration data comprises an IP address.

9. A method as in claim 1 wherein:
    the non-transitory computer readable storage medium comprises an in-memory database; and
    an in-memory database engine of the in-memory database constructs the tunnel proxy.

10. A method as in claim 1 wherein the first user chooses a connection type, wherein the first user specifies a duration of time associated with the connection type, and wherein access to the target system by the second user uses the connection type for the duration of time associated with the connection type.

11. A non-transitory computer readable storage medium embodying a computer program for performing a method, said method comprising:
    storing, in a non-transitory computer readable storage medium, configuration data used to establish a secure connection to a first network;
    receiving, in a first frontend application, a request from a first user of the first network, the first network comprising a first gateway to a target system, wherein the first user authorizes a second user to access the target system;
    receiving, in a backend application, a call from a second network initiated by the second user using a remote connectivity application, wherein the second network is remote from the first network, wherein the second network is coupled to the remote connectivity application, the second network comprising a second gateway;
    constructing a tunnel proxy based upon the configuration data to authorize the second user to access the target system;
    establishing, in response to the call,
    a first tunnel between a first connection component and the first gateway, and
    a second tunnel between a second connection component and the second gateway;
    utilizing the tunnel proxy to join the first tunnel with the second tunnel to create a link, wherein data flows between the first network and the second network using the link; and
    terminating the link.

12. A non-transitory computer readable storage medium as in claim 11 wherein the link is terminated based upon expiry of a timer.

13. A non-transitory computer readable storage medium as in claim 11 wherein the link is terminated based upon an authorization.

14. A non-transitory computer readable storage medium as in claim 13 wherein the authorization relates to the second user of the second network.

15. A non-transitory computer readable storage medium as in claim 11 wherein the configuration data is selected from at least one of a URL, a hostname, and an IP address.

16. A computer system comprising:
one or more processors;
a software program, executable on said computer system, the software program configured to cause an in-memory database engine of an in-memory database to:
store, in the in-memory database, configuration data used to establish a secure connection to a first network;
receive, in a first frontend application, a request from a first user of the first network, the first network comprising a first gateway to a target system, wherein the first user authorizes a second user to access the target system;
receive, in a backend application, a call from a second network initiated by the second user using a remote connectivity application, wherein the second network is remote from the first network, wherein the second network is coupled to the remote connectivity application, the second network comprising a second gateway;
construct a tunnel proxy based upon the configuration data to authorize the second user to access the target system;
establish, in response to the call,
a first tunnel between a first connection component and the first gateway, and
a second tunnel between a second connection component and the second gateway; and
utilize the tunnel proxy to join the first tunnel with the second tunnel to create a link,
wherein data flows between the first network and the second network using the link.

17. A computer system as in claim 16 wherein:
the configuration data is selected from at least one of a URL, a hostname, and an IP address.

18. A computer system as in claim 16 wherein the in-memory database is further configured to terminate the link.

19. A computer system as in claim 18 wherein the in-memory database engine is further configured to terminate the link based upon expiration of a timer.

20. A computer system as in claim 16 wherein the configuration data comprises an authorization of the second user of the second network.

\* \* \* \* \*